(12) United States Patent
Kim (10) Patent No.: US 8,393,420 B2
(45) Date of Patent: Mar. 12, 2013

(54) DRIVING SYSTEM FOR STAIR-CLIMBING VEHICLE

(76) Inventor: Ki-Soo Kim, Ansung-si (KR)

( * ) Notice: Subject to any disclaimer, the term of this patent is extended or adjusted under 35 U.S.C. 154(b) by 331 days.

(21) Appl. No.: 12/306,053

(22) PCT Filed: Jun. 26, 2007

(86) PCT No.: PCT/KR2007/003078
§ 371 (c)(1),
(2), (4) Date: Dec. 22, 2008

(87) PCT Pub. No.: WO2008/002050
PCT Pub. Date: Jan. 3, 2008

(65) Prior Publication Data
US 2009/0205881 A1   Aug. 20, 2009

(30) Foreign Application Priority Data

Jun. 27, 2006 (KR) .................. 10-2006-0058177

(51) Int. Cl.
*B62D 57/00* (2006.01)
(52) U.S. Cl. ...................... 180/8.2; 280/5.26
(58) Field of Classification Search .............. 180/8.2; 280/5.26; 305/1, 2
See application file for complete search history.

(56) References Cited

U.S. PATENT DOCUMENTS

| | | | | |
|---|---|---|---|---|
| 2,633,363 A * | 3/1953 | Marshall | ................. | 280/5.26 |
| 2,706,640 A * | 4/1955 | Marshall | ................. | 280/5.26 |
| 3,241,848 A * | 3/1966 | Flory | ................. | 280/5.26 |
| 3,283,839 A * | 11/1966 | Brown et al. | ................. | 180/8.2 |
| 3,346,268 A * | 10/1967 | Richman | ................. | 280/5.26 |
| 3,348,518 A * | 10/1967 | Forsyth et al. | ................. | 440/12.66 |
| 3,450,219 A * | 6/1969 | Fleming | ................. | 180/8.2 |
| 3,638,745 A * | 2/1972 | Floyd | ................. | 60/466 |
| 4,709,772 A * | 12/1987 | Brunet | ................. | 180/8.2 |
| 4,790,548 A * | 12/1988 | Decelles et al. | ................. | 280/5.26 |
| 5,971,091 A * | 10/1999 | Kamen et al. | ................. | 180/218 |
| 6,443,250 B1 * | 9/2002 | Kamen et al. | ................. | 180/8.1 |
| 6,484,829 B1 * | 11/2002 | Cox | ................. | 180/8.1 |
| 6,915,878 B2 * | 7/2005 | Kamen et al. | ................. | 182/141 |
| 7,357,202 B2 * | 4/2008 | Kamen et al. | ................. | 180/65.1 |
| 2002/0023787 A1 * | 2/2002 | Kamen et al. | ................. | 180/7.1 |
| 2004/0149499 A1 * | 8/2004 | Kim | ................. | 180/8.2 |

FOREIGN PATENT DOCUMENTS

| | | | |
|---|---|---|---|
| JP | 57110569 A * | 7/1982 | |
| JP | 06092272 A * | 4/1994 | |
| KR | 10-2001-0049058 | 6/2001 | |
| KR | 10-2001-0049062 | 6/2001 | |

OTHER PUBLICATIONS

International Search Report—PCT/KR003078 dated Sep. 21, 2007.
Written Opinion—PCT/KR003078 dated Sep. 21, 2007.

* cited by examiner

*Primary Examiner* — James Kramer
*Assistant Examiner* — Wesley Potter
(74) *Attorney, Agent, or Firm* — Cantor Colburn LLP (57) ABSTRACT

A driving system that can allow a vehicle to go over or ascend obstacles or stairs through a step driving manner is provided. The driving system includes a power transmission unit connected to a main shaft connected to a power generation unit installed on the wheel frame, a plurality of driven units engaged with the power transmission unit and supporting the rotation of wheels by rotational force from the power transmission unit, and a carrier to which the power transmission unit and each of the driven units are operationally fixed and which goes over the obstacles by rotating when the driven units are stopped by the obstacles.

9 Claims, 9 Drawing Sheets

DRIVING SYSTEM FOR STAIR-CLIMBING VEHICLE

FIELD OF THE INVENTION

The present invention relates to a driving system for a stair-climbing vehicle that can be applied to a variety of vehicles, and more particularly, to a driving system that can allow a vehicle to go over obstacles or ascend or descend stairs when the vehicle encounters the obstacles or stairs, while being driving by rotation of its wheels, and which can be stably driven with low power on an even road.

BACKGROUND OF THE INVENTION

Generally, a variety of vehicles such as passenger cars for drivers or passengers, wheelchairs used for patients or handicapped persons, trucks used for carrying cargos and loads, and special cars such as armored vehicles and specially-equipment vehicles have been developed to enhance convenience and be effectively used for special purposes.

Figure 1:
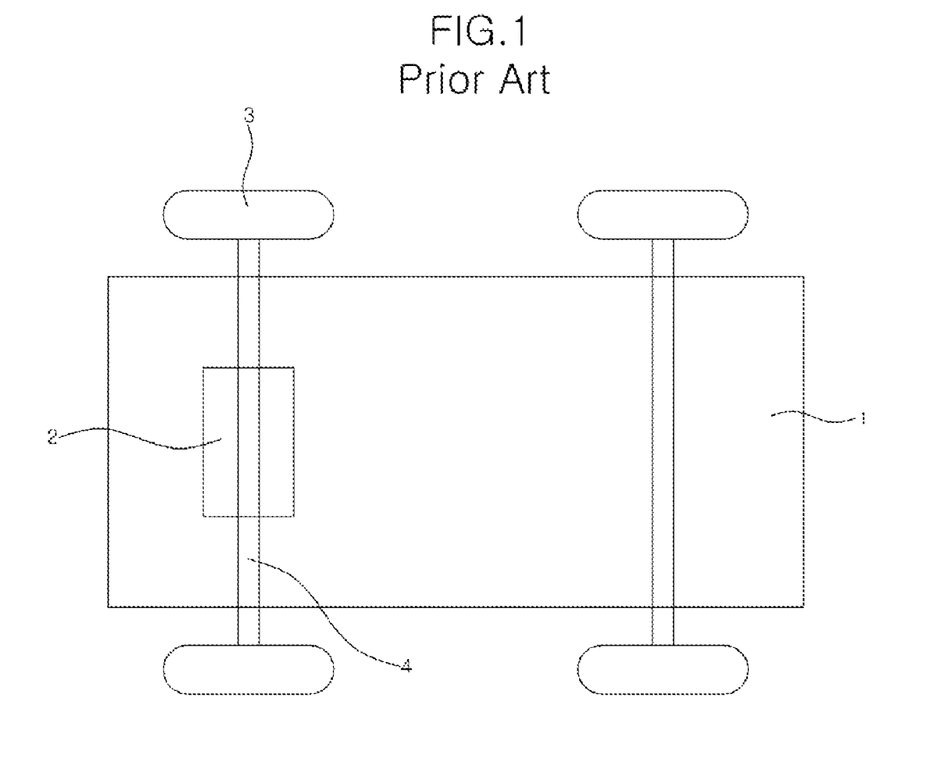
FIG. 1 is a schematic diagram of a conventional vehicle.
Figure 2:
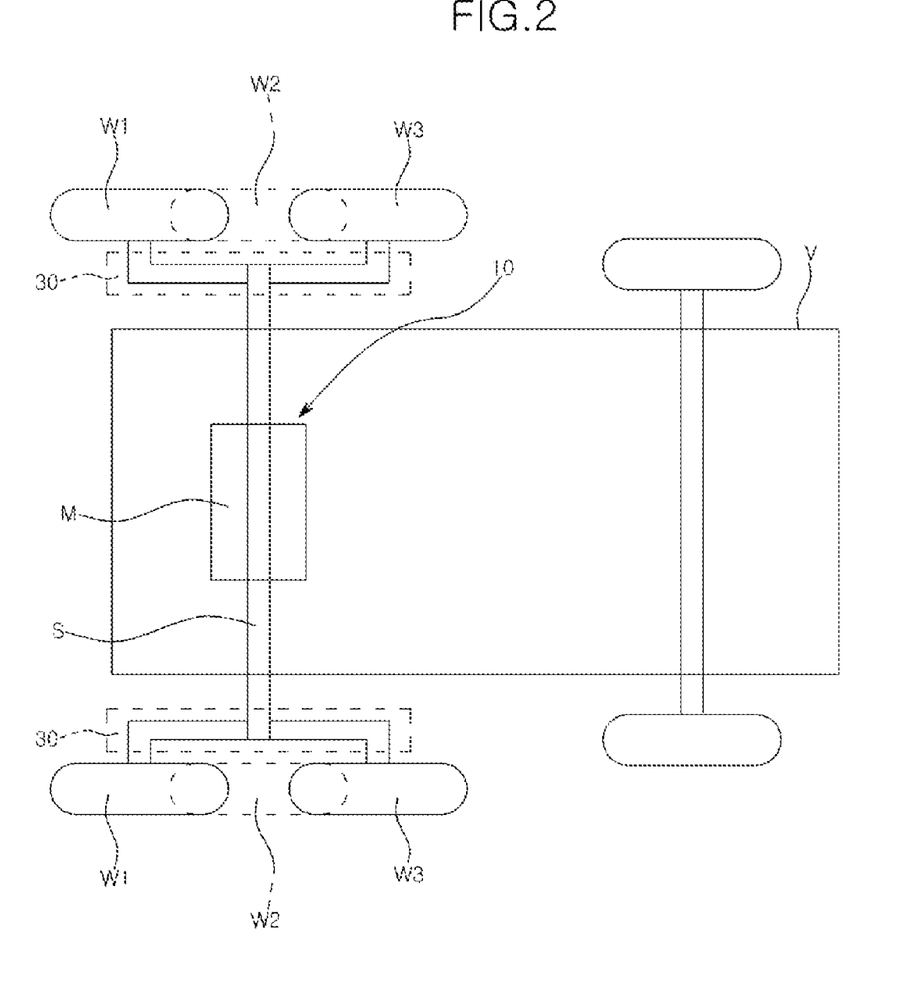
FIG. 2 is a schematic view illustrating an application state of a driving system according to an embodiment of the present invention.
Figure 3:
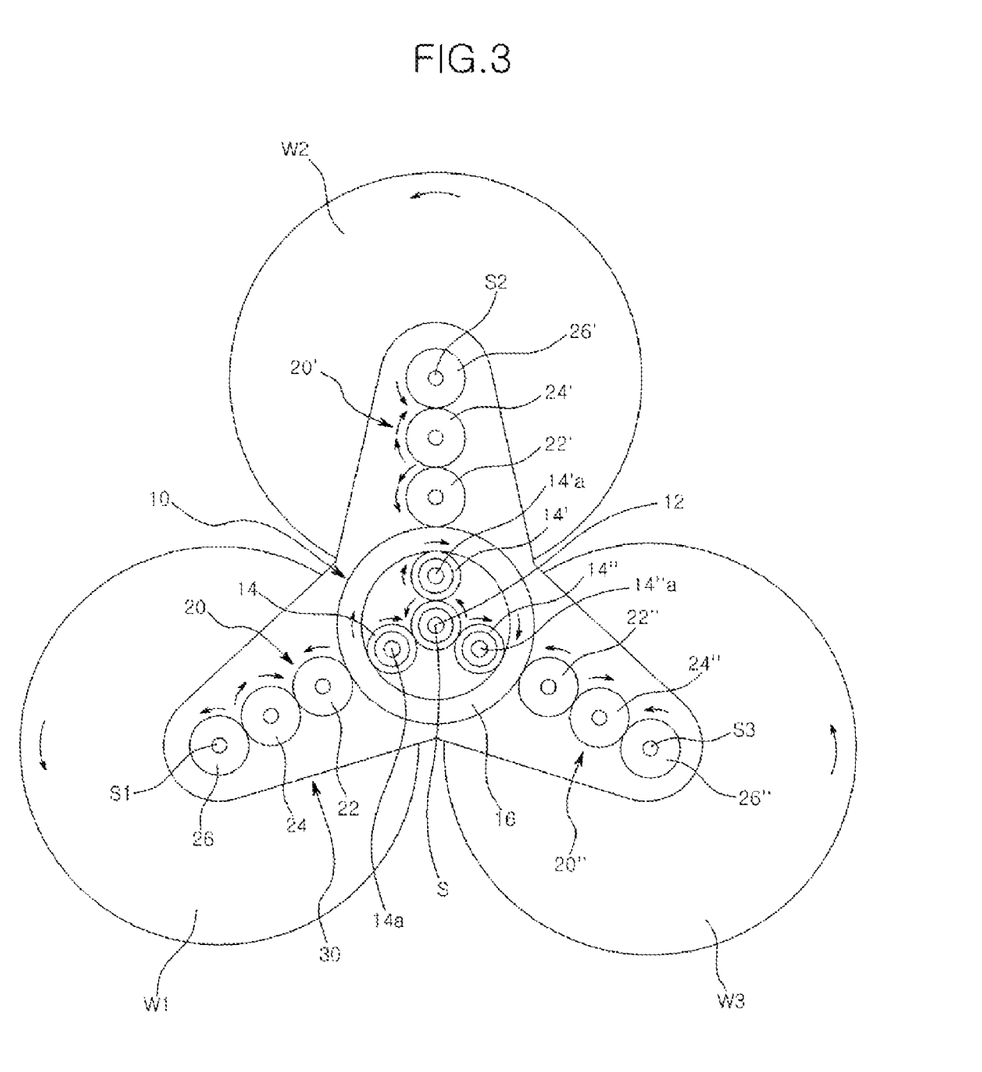
FIG. 3 is a side view illustrating a half or one side of the driving system according to an embodiment of the present invention.

As shown in FIG. 1, a conventional vehicle includes a wheel frame 1 that can be formed in a variety of designs capable of receiving persons or cargos. An engine is mounted on a predetermined location of the wheel frame to generate power. Driving shafts 4 are further installed on the wheel frame 1 to drive wheels 3 by receiving the power from the engine 2. Therefore, when the engine operates, the wheels 3 connected to the driving shafts 4 rotate to drive and move the vehicle.

The conventional vehicle is generally configured such that the wheels perform only the rotating drive with respect to axle shafts or driving shafts. Therefore, on an even road or when an obstacle is less than a predetermined height, the vehicle can easily move. However, when the vehicle meets a sand field, a muddy field, a high obstacle, or stairs, the wheels may not have any traction or may not go over the obstacle, and thus the vehicle cannot be driven or move.

SUMMARY OF THE INVENTION

Accordingly, the present invention has been made in an effort to obviate one or more of the problems due to limitations and disadvantages of the related art. It is an object of the present invention to provide a driving system for a stair-climbing vehicle, capable of allowing a vehicle to go over obstacles or ascend or descend stairs when the vehicle is driven by rotation of its wheels and encounters the obstacles or stairs and which is stably driven with low power on an even road.

It is another object of the present invention to provide a driving system for a stair-climbing vehicle having a carrier that can be driven when a load greater than a predetermined load is applied to wheels.

It is still another object of the present invention to provide a driving system for a stair-climbing vehicle that can minimize power consumption when a vehicle runs on an even road and prevent going in reverse.

To achieve the objects, the present invention provides a driving system for a stair-climbing vehicle that is installed on a wheel frame to allow a vehicle to go over obstacles and ascend stairs, the driving system including: a power transmission unit connected to a main shaft connected to a power generation unit installed on the wheel frame; a plurality of driven units engaged with the power transmission unit and supporting wheels rotated by rotational force from the power transmission unit; and a carrier to which the power transmission unit and each of the driven units are operationally fixed and which goes over the obstacles by rotating when the driven units stop due to the obstacles.

According to another feature of the present invention, the driving system for a stair-climbing vehicle further includes a wheel shift unit that, when the wheel body having a plurality of wheels connected to the driving system runs on an even road, shifts one of at least two wheels contacting the road away from the road. The wheel shift unit includes a shift plate on a center of which the main shaft of the driving unit is rotatably fixed; a plurality of shift gears provided on end portions of shafts of the wheels extending toward the shift plate; and a support gear, which is provided on a connection shaft rotatably provided on a portion of the shift plate, surface or line-contacts the shift gear selectively, contacts the shift gear to be capable of shifting.

DETAILED DESCRIPTION OF THE INVENTION

Reference will now be made in detail to preferred embodiments of the present invention, examples of which are illustrated in the accompanying drawings. For clarity, a half section of the driving unit is shown in detail. In addition, terms related to direction hereinafter denote viewing from the front of the drawings, and the scope of the present invention is not limited thereto.

Referring first to FIGS. 2 to 5C, a driving system according to an embodiment of the present invention is installed on a wheel frame V of a vehicle such as a passenger car, a commercial car, a carrying unit, and a wheelchair. The driving system is connected to a main shaft S such as an axle shaft provided on a power generation unit M such as a combustion engine or an electric motor installed on the wheel frame V to receive power such as rotational force. In this embodiment, a driving portion related to a first wheel W1 among wheels for moving the wheel frame V will be described in detail. It will be obvious that the driving portion will be identically applied to second, third or/and fourth wheels W2, W3, or/and W4.

Figure 4:
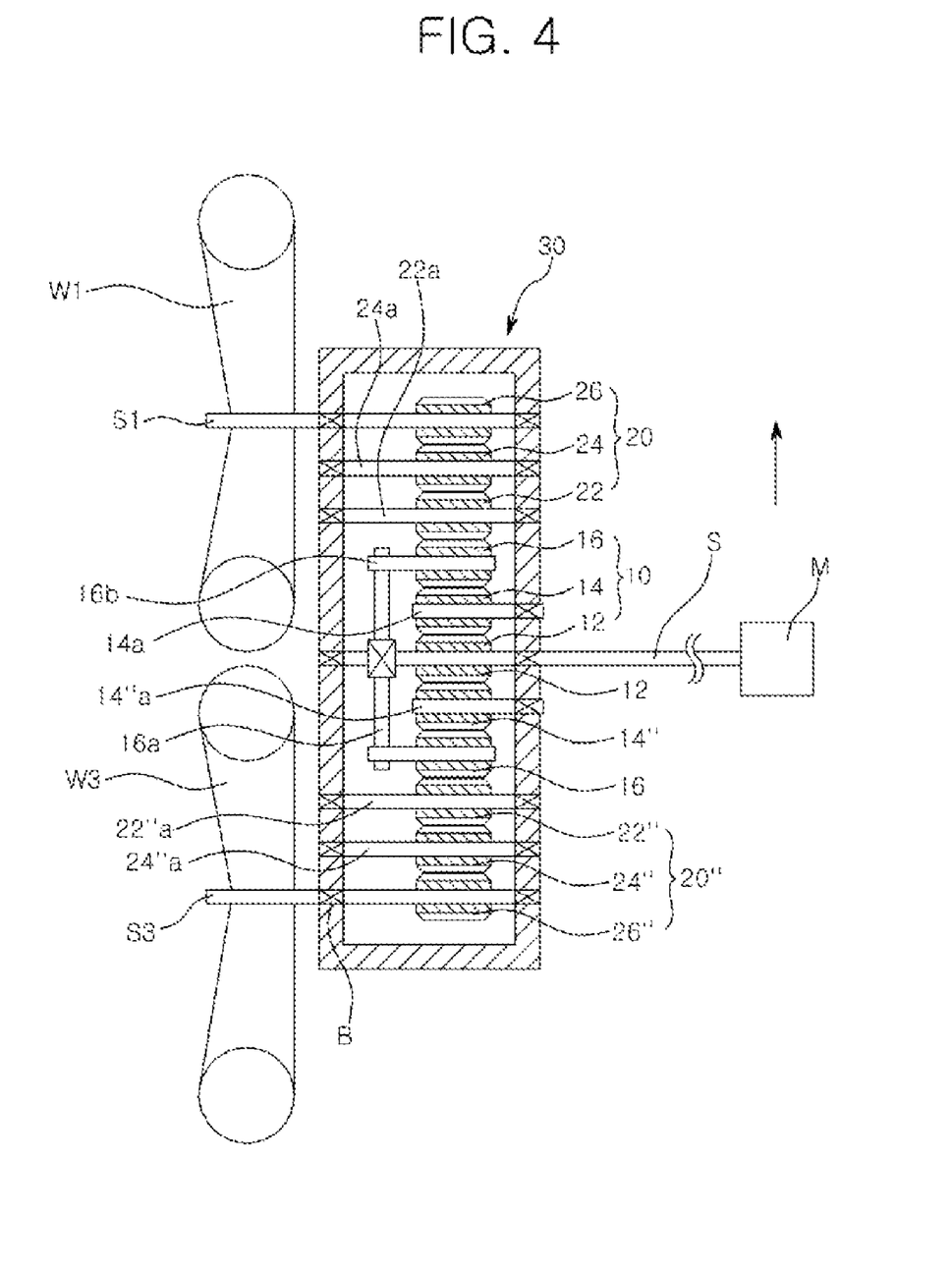
FIG. 4 is a detailed sectional view of a structure of the driving system of FIG. 3.

The main shaft S includes a power transmission unit 10 for transmitting the rotation power of the main shaft S. The power transmission unit 10 includes a sun gear 12 fixed on the main shaft S, a plurality of planet gears 14 engaged with an outer circumference of the sun gear 12, and a ring gear 16 engaged with outer circumferences of the planet gears 14 and rotating in a direction in which the planet gears 14 rotate. Here, each of the planet gears 14 is rotated about its axis by the rotation of the sun gear 12 or is rotated around the sun gear by a load. The ring gear 16 is provided with teeth formed on inner and outer circumferences. A cover 16a is connected to the ring gear 16 to protect the ring gear 16 from external impacts and to allow the ring gear 16 to effectively perform driving. The cover 16a is connected to a body of the ring gear 16 by a rod 16b.

That is, a driven unit 20 is installed on the power transmission unit 10. The driven unit 20 may be formed in a gear train having a plurality of gears.

That is, the driven unit 20 includes a lead gear 22 engaged with gear teeth formed on the outer circumference of the ring gear 16, a connection gear 24 engaged with the lead gear 22, and a driving gear 26 engaged with the connection gear 24. A shaft 51 of the wheel W1 is fixed on the driving gear 26 to rotate the wheel W1.

The power transmission unit 10 and the driven unit 20 may be shielded by a carrier 30.

The sun gear 12 and planet gears 14 of the power transmission unit 10 and the lead gear 22, connection gear 24, and driving gear 26 of the driven unit 20 are fixed on the carrier 30 by their respective shafts S, 14a, 22a, 24a, 51, S2, and S3 and bearings B.

Further, the carrier 30 may be designed in a variety of shapes in accordance with the number of the wheels and the arrangement of the gears. Alternatively, the carrier 30 may be designed in a wheel box shape and substantially function as a wheel box.

As described above, the power transmission unit 10 and the driven unit 20 that are applied to the first wheel W1 can be identically applied to the second, third, or/and fourth wheels W2, W3, or/and W4. Therefore, like constituent elements of the power transmission unit and driven unit that are related or applied to the second wheel W2 have respective reference symbols each assigned with "'", and constituent elements of the power transmission unit and driven unit that are related or applied to the third wheel W3 have respective reference symbols each assigned with "''". Needless to say, like constituent elements perform like functions. Therefore, a detailed description of like constituent elements will be omitted herein for simplicity.

Figure 6A:
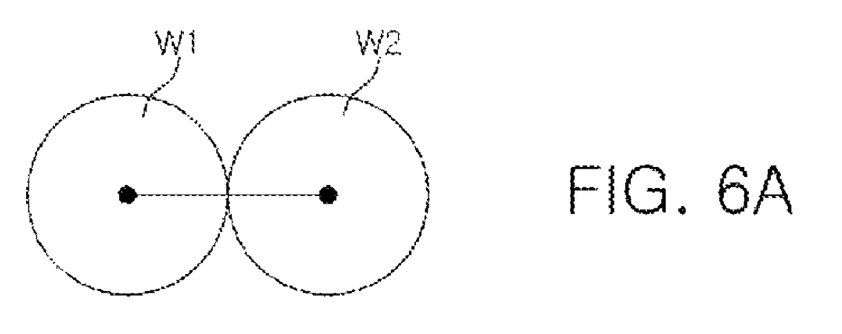
FIGS. 6A to 6B are side views illustrating an outer structure of a driving system according to another embodiment of the present invention.
Figure 6B:
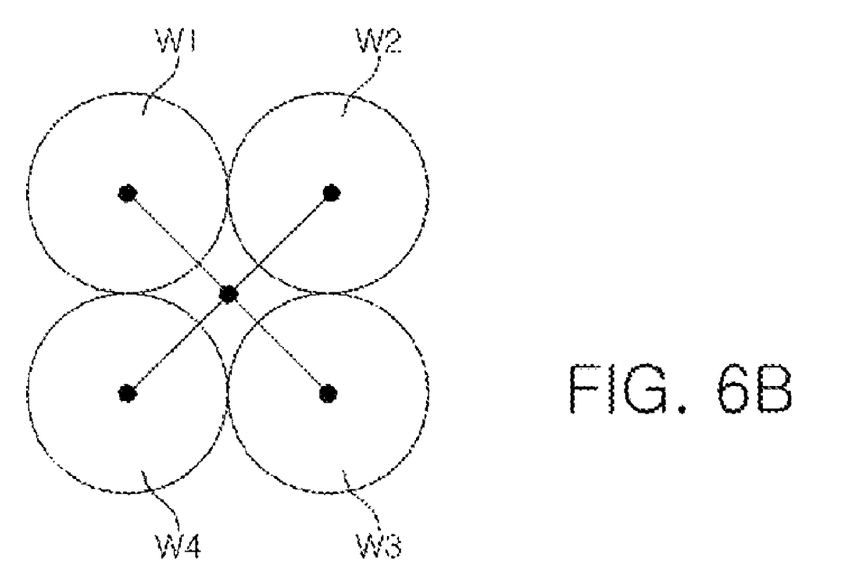

Alternatively, in one embodiment of the present invention, a driving system having three wheels is described. However, as shown in FIGS. 6A and 6B, it will be obvious that a vehicle or wheelchair having two or four wheels may have identical constituent elements having identical functions. As shown in FIG. 6B, when the vehicle has four wheels, the driving system and constituent elements applied to the wheels W1, W2, and W3 will be identically applied to the fourth wheel W4.

Meanwhile, as shown in FIGS. 7A to 9B, a vehicle of a second embodiment of the present invention further includes a wheel shift device 40 that can minimize consumption of driving force by minimizing a contact area with a road when a vehicle such as a wheelchair moves on an even road. That is, when the vehicle drives on an even ground or a gentle slope, the wheel shift device 40 functions to allow only one of the wheels W1, W2, W3, or/and W4 to contact the road and to maintain shifted states of the rest of the wheels.

Figures 7A, 7B:
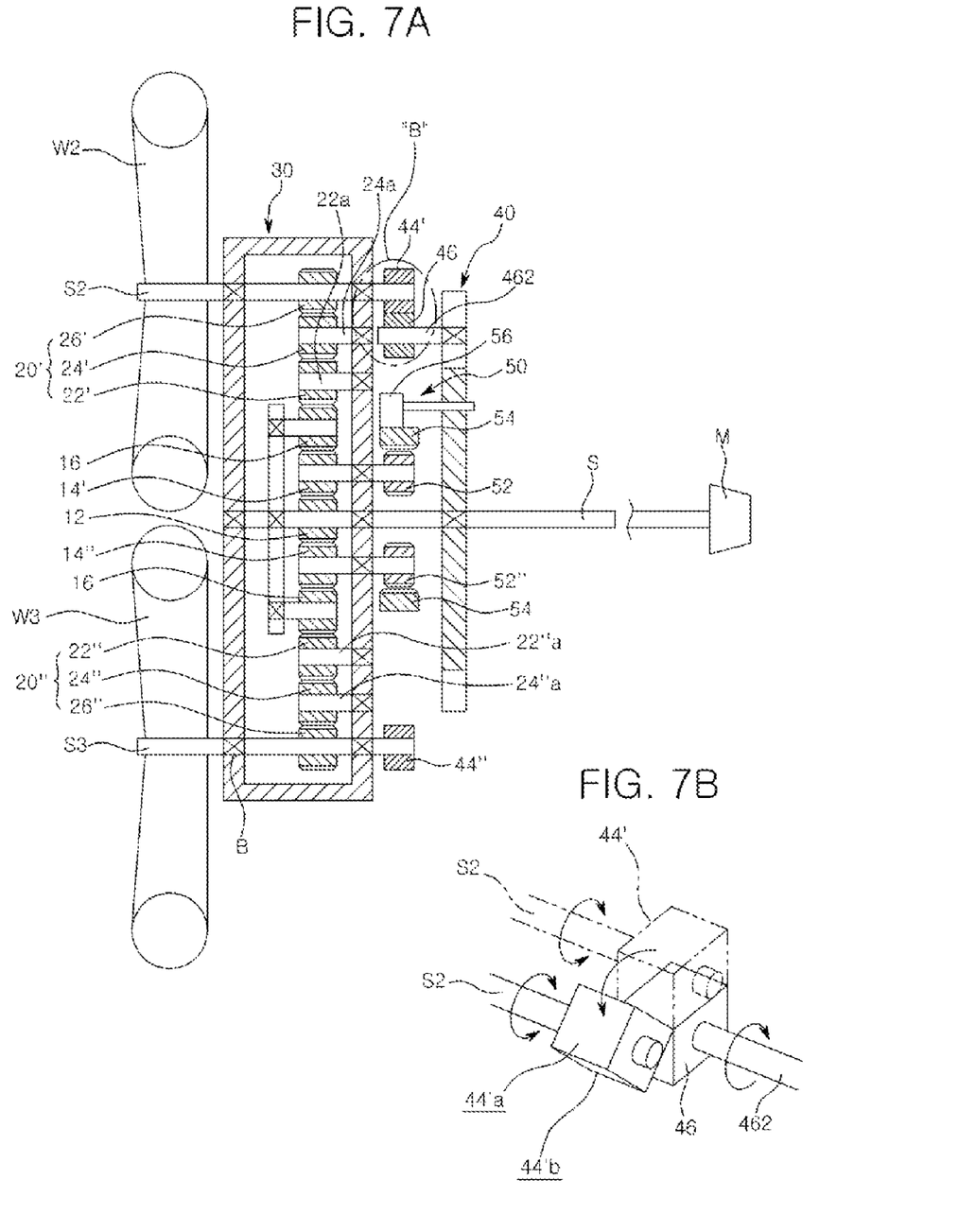
FIG. 7A is a sectional view of a driving system according to another embodiment a for stair-climbing vehicle of the present invention.
FIG. 7B is a partial schematic view of section "B" of FIG. 7A.

The wheel shift device 40 includes a shift plate 42. The main shaft S of the driving system is rotatably fixed on a center of the shift plate 42. The shift plate 42 may be formed in a variety of shapes and designed to be smaller than the carrier 30.

Meanwhile, a shift gear 44, 44', 44'' is integrally formed with an end of a shaft 51, S2, S3 of the wheel W1, W2, W3, which extends toward the shift plate 42 through the driving gear 26, 26', 26''. The shift gear 44, 44', 44'' integrally rotates together with the wheel W1, W2, W3 and the driving gear 26, 26', 26''.

Correspondingly, a support gear 46 that is selectively coupled to one of the shift gears 44, 44' and 44'' is provided on a portion of the shift plate 42. The support gear 46 is rotatably fixed on the portion of the shift plate 42 by a shaft 462.

Especially, the shift gears 44, 44', and 44'' and the support gear 46 are formed in a rectangular gear so that they can contact each other. That is, the shift gear 44, 44', 44'' and the support gear 46 are formed in the rectangular shape having four flat surfaces 44a, 44'a, 44''a, 46a and four corners 44b, 44b', 44b'', 46b so that they can surface-contact each other.

Through the structures and coupling of the shift gear 44, 44', 44'' and the support gear 46, when, for example, the wheelchair operates, each flat surface of the shift gear 44, 44', 44'' and each flat surface of the support gear 46 surface-contacts each other and then the shift gear 44, 44', 44'' rotates around the support gear 46 within a predetermined range while rotating about its axis. Finally, the corner 44b, 44'b, 44''b or flat surface 44a. 44'a, 44''a of the shift gear 44, 44', 44'' surface-contacts the flat surface 46a. In this state, the shift gear 44. 44', 44'' rotates about its axis.

In addition, according to another feature of the present invention, the driving system further includes a reverse drive preventing unit 50 so as to move the wheelchair or other vehicle in an advancing direction desired by the user or passenger.

The reverse drive preventing unit 50 includes sub-planet gears 52, 52', 52'' provided on ends of shafts 14a, 14'a, 14''a extending from the respective planet gears 14, 14', 14''. A sub-ring gear 54 is rotatably engaged with the sub-planet gears 52, 52', 52''. Gear teeth 54a are formed on an outer circumference of the sub-ring gear 54 and a ratchet that will be described layer is separately engaged with the gear teeth 54a of the sub-ring gear 54.

Figure 8:
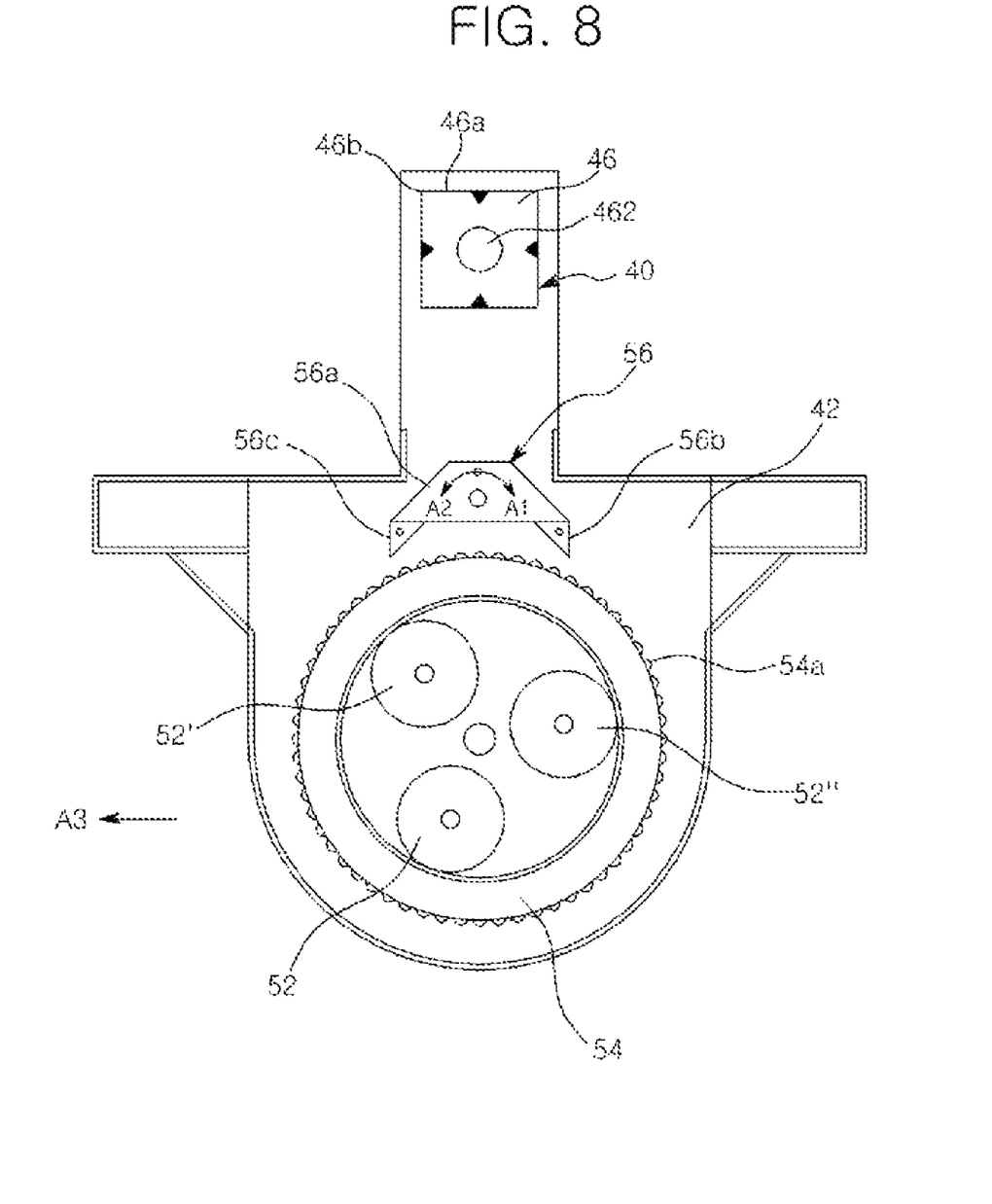
FIG. 8 is an enlarge side view of a latchet unit of the driving system for a stair-climbing vehicle of FIG. 7.

Meanwhile, the ratchet 56 is installed on the shift plate 42. The ratchet 56 is coupled to one of the teeth 54a formed on the outer circumference of the sub-ring gear to prevent the sub-ring gear from reversely rotating—i.e., to prevent the sub-ring from rotating in a direction opposite to the advancing direction. In order for the driver or passenger to stably manipulate the ratchet 56 manually or automatically, the ratchet 56 is installed together with a manipulation unit such as a handle on a proper portion of the shift plate 42 or installed on a manipulation base of the vehicle such as the wheelchair to be remotely controlled.

The ratchet 56 includes a body 56a that is fixed on the shift plate 42 to be pivoted frontward and rearward, a first coupling member 56b that is formed on one side end of the body 56a and detachably coupled to one of the teeth 54a of the sub-ring gear 54, and a second coupling member 56c that is formed on the other side end of the body 56a and detachably coupled to one of the teeth 54a of the sub-ring gear.

When the vehicle such as the wheelchair moves frontward, the first coupling member 56b of the ratchet 56 pivots in the forward direction A1 to contact one of the teeth 54a of the sub-ring gear 5 in an idle state. At this point, when the wheelchair moves normally in the forward direction, the first coupling member 56a simply contacts the tooth 54a of the sub-ring gear 54. When the wheelchair is inadvertently driven in a reverse direction, one of the teeth 54a of the sub-ring gear is coupled to the first coupling member 56b to prevent the wheelchair from moving in a reverse direction.

On the other hand, when the vehicle such as the wheelchair moves in a rearward direction by the user or passenger, the second coupling member 56c of the ratchet 56 pivots in a rearward direction A2 to contact one of the teeth 54a of the sub-ring gear 54 in an idle state. At this point, when the wheelchair moves normally in the rearward direction, the second coupling member 56c simply contacts the tooth 54a of the sub-ring gear 54. When the wheelchair is inadvertently driven in the forward direction, one of the teeth 54a of the sub-ring gear is coupled to the second coupling member 56c to prevent the wheelchair from moving in the forward direction.

The following will describe an operation and operational mode of the driving system with reference to the accompanying drawings.

First, when the vehicle in which the driving system is installed runs on an even road or goes over a low obstacle and the power generation unit M such as a motor operates, the sun gear 12 of the power transmission unit 10 mounted on the main shaft S rotates counterclockwise and the planet gears 14, 14', 14" engaged with the sun gear 12 rotates about their axes clockwise. In addition, the ring gear 16 rotates clockwise.

When the ring gear 16 rotates, the lead gears 22, 22', 22" of the driving unit 20, 20', 20" engaged with the ring gear 16 rotate counterclockwise and, at the same time, the driving gear 26, 26', 26" rotates counterclockwise.

Figure 5A:
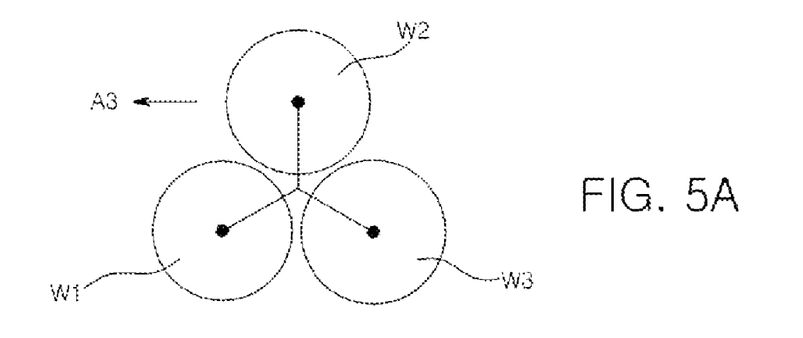
FIGS. 5A to 5C are views illustrating a driving state of a driving system according to an embodiment of the present invention.

Accordingly, the first and third wheels W1 and W3 connected to the respective driving gears 26 and 26" of the driven units 20 and 20" advances in an arrow direction A3 on the road (see FIG. 5A). Since the advancing condition of the vehicle is that an idle load of the carrier 30 is greater than the rotational force of the planet gears about their axes, the planet gears can be limited within a range where they can rotate about their axes.

Meanwhile, when the vehicle moves as described above and meets a high obstacle or stairs, the vehicle can go over the obstacle as the first wheel W1 used as a supporting point and the second, third, and first wheels W2, W3, and W1 go over the obstacle in this order. When this operation is repeated, the vehicle ascends the stairs ST (see FIG. 5B).

Figure 5B:
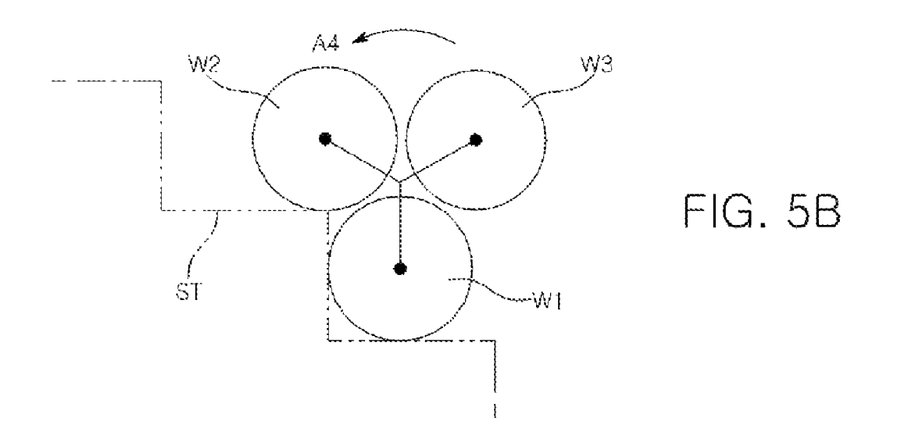
Figure 5C:
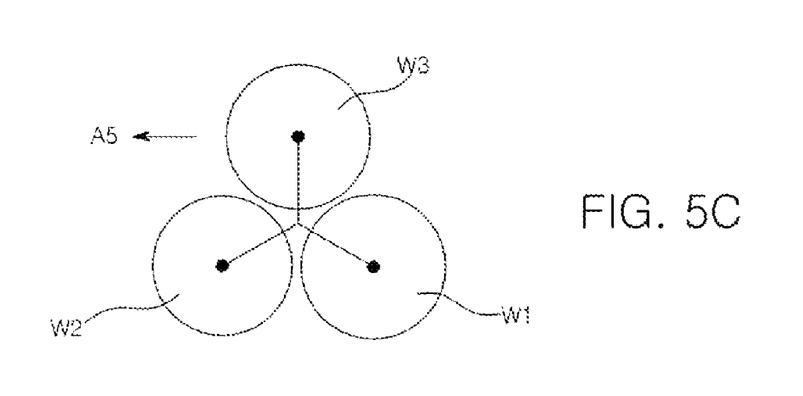

That is, when the first wheel W1 is stuck on the obstacle or stairs ST, the driving gear 26 of the driven unit 20 stops and thus the connection gear 24 and the lead gear 22 that are sequentially connected to the driving gear 26 stop simultaneously. At this point, the ring gear 16 momentarily stops.

Even when the ring gear 16 stops, the power generation unit M keeps operating to transmit torque to the power transmission unit 10 through the driving shaft S and thus the sun gear 12 keeps rotating. At this point, since the load applied to the ring gear 16 is greater than the force for rotating the planet gears 14, 14', 14" about their axes, the planet gears 14, 14', 14" rotate around the inner circumference of the ring gear 16. As a result, the carrier 30 connected to the planet gears rotates counterclockwise about the shaft of the driving gear 26.

When the carrier keeps rotating as described above, the second wheel W2 is disposed in front of the first wheel W1 and the third wheel W3 is disposed above the first and second wheels W1 and W2. Therefore, the vehicle returns to the initial driving state to advance in an arrow direction A5 (see FIG. 5C).

Needless to say, when the obstacle is not high and the vehicle has three wheels, the carrier 30 rotates 120° (⅓ turn) by one time or two times to go over the obstacle. When the vehicle meets the stairs, the above described rotational movement of the carrier 30 is continuously repeated so that the vehicle ascends the stairs.

Figure 9A:
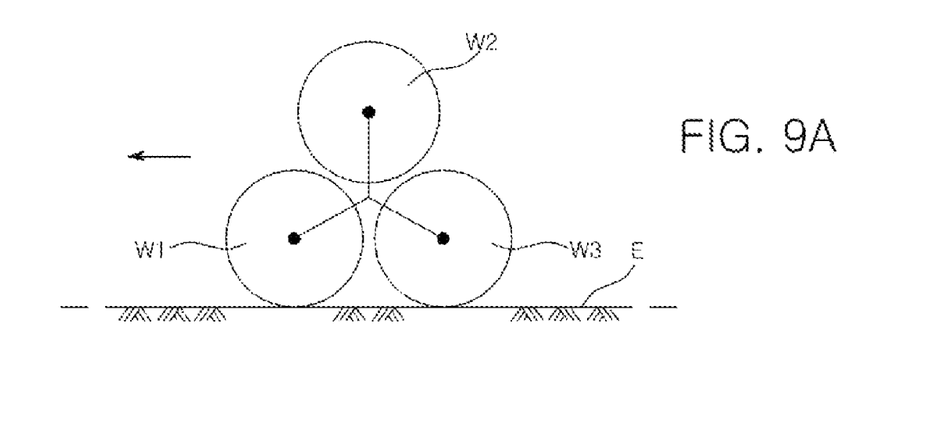
FIGS. 9A and 9B are views illustrating driving states of FIG. 7A.
Figure 9B:
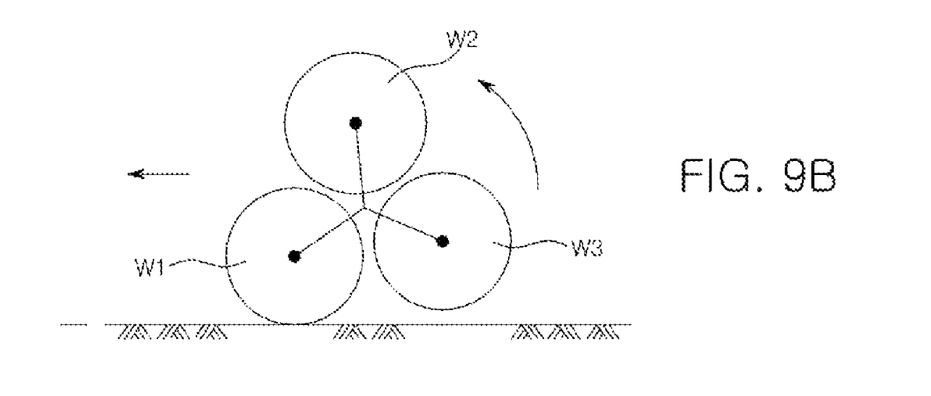

Meanwhile, as shown in FIGS. 7A through 9B, when the wheel shift device 40 is further mounted on the driving system, the driving system can be driven with less power. That is, as shown in FIG. 9A, when the vehicle such as the wheelchair runs on an even road, as shown in FIG. 9B, a rear wheel (i.e., the third wheel W3 is lifted or shifted using the second wheel W2 as a supporting point so that only one front wheel (i.e., the first wheel W1) can contact the road.

In more detail, when the vehicle moves on the even road in a state where the first and third wheels W1 and W3 are disposed in front and rear and contact the road E, as shown in FIG. 9A, the shift gear 44' of the wheel shift device 40 provided on an end portion of the shaft S2 of the second wheel W2 rotates about its axis and rotate around the support gear 46 within a predetermined range in a state where the flat surface 46a surface-contacts the supporting gear 46 of the wheel shift device 40 in an initial state. Therefore, the wheel shift device 40 is shifted upward by a predetermined height and thus, the shaft S2 and the wheel W2 that are connected to the shift gear 44' are lifted or shifted by a predetermined height. In addition, the third wheel W3 connected to the shaft S3 and the carrier 30 are also shifted. At this point, the corners 44'b or flat surface 44'a of the shift gear 44' of the wheel shift device 40, which is associated with the second wheel W2, surface or line-contacts the flat surface 46a or corner 46b of the supporting gear 46 and thus, the shift gear 44' continues rotating about its axis.

Therefore, as shown in FIG. 9B, the third wheel W3 is shifted away from the road E by the shifting operation of the second wheel W2, and only the first wheel W1 maintains the contact state with the road. As a result, the vehicle wheelchair or other vehicle moves on the even road smoothly and economically.

In this embodiment, a case where the second wheel W2 is associated with the wheel shift device 40 and lifts the third wheel W3 from the road is described. However, it can be understood by a person of ordinary skill in the art that the first and third wheels W1 and W3 can be identically associated with the wheel shift device 40. That is, when the first wheel W1 is associated with the wheel shift device 40, the second wheel W2 is shifted away from the ground. When the third wheel W3 is associated with the wheel shift device 40, the first wheel W1 is shifted away from the ground.

Meanwhile, when the reverse drive preventing unit 50 is provided to the driving system of the present invention, the vehicle can move in a direction the user wants without being reversely driven or pushed backward.

In more detail, when the user intends to move the wheelchair frontward on a sloped road or hill and thus pivots the ratchet 56 in the arrow direction A1, the first coupling member 56b contacts the tooth 54a of the sub-ring gear 54 in an idle state. That is, when the wheelchair moves frontward, the first coupling member 56b simply contacts the tooth 54a of the sub-ring gear 54 so that the wheelchair can move frontward normally. However, when the wheelchair is inadvertently driven in a reverse direction to stop, the first coupling member 56b provided on the one side end of the body 56a of the ratchet 56 is coupled to one of the teeth 54a of the sub-ring gear 54 to prevent the sub-ring gear 54 from rotating, thereby preventing the wheelchair from being driven in the reverse direction.

On the other hand, when the user intends to move the wheelchair rearward and thus pivots the ratchet 56 in the arrow direction A2, the second coupling member 56c contacts the tooth 54a of the sub-ring gear 54 in an idle state. That is, when the wheelchair moves rearward, the second coupling member 56c simply contacts the tooth 54a of the sub-ring gear 54 so that the wheelchair can move normally rearward. However, when the wheelchair is inadvertently driven in the forward direction to stop, the second coupling member 56c of the ratchet 56 is coupled to one of the teeth 54a of the sub-ring gear 54 to prevent the sub-ring gear 54 from rotating, thereby preventing the wheelchair from being driven in the reverse direction.

Needless to say, when the user or passenger intends to move the wheelchair frontward or rearward, the ratchet 56 is manipulated such that the coupling member 56b, 566c does not contact or smoothly contact the tooth 54a of the sub-ring gear 54 so that the sub-ring gear 54 can smoothly rotate in a direction the user wants, thereby enabling the wheelchair to move forward and rearward.

Although only a case where the vehicle moves frontward is described in the above embodiment, the vehicle can move rearward and perform the stepping operating by reversely operating the power generation unit or reversely rotating the main shaft using a differential unit.

In addition, when the driving system is installed to be associated with the driving shaft of the front wheels, the front wheels can be used as wheels associated with a steering wheel. When the driving system is installed to be associated with the driving shaft of the rear wheels, fuel consumption can be reduced and faster speeds can be realized. Needless to say, the driving system may be installed to be associated with both of the driving shafts of the front and rear wheels.

As described above, according to the driving system of the present invention, the driving system can allows the wheelchair or other vehicle to go over obstacles by rotating the carrier using a driving gear connected to one of the wheels as a supporting shaft and allowing the following wheels to go over the front wheel and can allow the vehicle to ascend the stairs by continuously performing the above rotation of the carrier.

Further, when the wheelchair or other vehicle having three or more wheels runs on the even road, the driving system can reduce power consumption and maintain a smooth running state by shifting a rear one of two wheels contacting the road away from the road.

In addition, since the driving system has the reverse drive preventing unit that can prevent the vehicle from driving in a direction the user does not want, driving stability can be enhanced.

What is claimed is:

1. A driving system for a stair-climbing vehicle that is installed on a wheel frame of the vehicle to allow the vehicle to go over obstacles and ascend stairs, the driving system comprising:
   a power transmission unit connected to a main shaft of a power generation unit installed on the wheel frame, and includes a sun gear fixed on the main shaft of the power generation unit, a plurality of planet gears engaged with an outer circumference of the sun gear, and a ring gear engaged with the planet gears;
   a plurality of driven units engaged with the power transmission unit and supporting wheels rotating by rotational force of the power transmission unit;
   a carrier to which the power transmission unit and each of the driven units are operationally fixed and which goes over the obstacles by rotating when the driven units stop due to the obstacles; and
   a wheel shift unit which, when the vehicle having the wheels runs on an even road, shifts one of at least two of the wheels contacting the even road away from the even road.

2. The driving system of claim 1, wherein the ring gear includes a cover which shields a circumference of the ring gear and allows the ring gear to effectively drive, and the cover is connected to a body of the ring gear by a rod.

3. The driving system of claim 1, wherein each driven unit includes a lead gear engaged with the ring gear of the power transmission unit, a connection gear engaged with the lead gear, and a driving gear that is engaged with the connection gear, supports a shaft of a respective one of the wheels, and rotates the respective wheel.

4. The driving system of claim 3, wherein the carrier shields the power transmission unit and the driven units; and
   the sun gear and planet gears of the power transmission unit, and the lead gear, connection gear, and driving gear of the driven unit are rotatably fixed on the carrier by shafts and bearings.

5. The driving system of claim 1, wherein the wheel shift unit includes:
   a shift plate on a center of which the main shaft of the power generation unit is rotatably fixed;
   a shift gear provided on an end of a shaft of one of the wheels extending toward the shift plate; and
   a support gear, which is provided on a connection shaft rotatably provided on a portion of the shift plate,
   wherein each of the support and shift gears has a flat face and a straight edge, and
   wherein the flat faces of the support and shift gears or the straight edges of the support gear and shift gears are selectively in contact with each other to shift the one of the at least two wheels contacting the even road away from the even road.

6. The driving system of claim 5, wherein each of the shift and support gears includes three additional flat surfaces and three additional straight edges.

7. The driving system of claim 5, wherein the shift gear and the support gear contact each other such that the shift gear rotates together with the support gear within a predetermined range about their axes and rotate around the support gear, and the straight edge or the flat surface of the shift gear contacts the flat surface or the straight edge of the support gear to rotate about its axis.

8. The driving system of claim 1, further comprising a reverse drive preventing unit which restricts rotation of the planet gears of the power transmission unit in accordance with an advancing direction of the wheel frame to allow a passenger to move the wheel frame as the passenger directs.

9. The driving system of claim 8, wherein the reverse driving preventing unit includes:
   sub-planet gears provided on respective end portion of extending shafts of the planet gears of the power transmission unit and provided with gear teeth at outer circumferences;
   a sub-ring gear disposed around the sub-planet gears, rotatably engaged with the sub-planet gears, and provided with gear teeth at an outer circumference; and
   a ratchet including a body pivotally fixed on a shift plate of the wheel shift unit, a first coupling member formed on one side end of the body, detachably engaged with the teeth of the sub-ring gear, and restricting rotation of the sub-planet gears when the wheel flame moves forward, and a second coupling member formed on the other side end of the body, detachably engaged with the teeth of the sub-ring gear, and restricting rotation of the sub-planet gears when the wheel flame moves rearward.

* * * * *